United States Patent [19]

Fisk

[11] 4,004,822
[45] Jan. 25, 1977

[54] TRAILER HITCH ADAPTER

[76] Inventor: Harold E. Fisk, 3211 Hayes St., Marne, Mich. 49435

[22] Filed: Jan. 2, 1976

[21] Appl. No.: 645,998

[52] U.S. Cl. .......................... 280/415 A; 280/504; 280/515
[51] Int. Cl.² .......................................... B60D 1/14
[58] Field of Search ....... 280/415 R, 415 A, 415 B, 280/417, 504, 507, 511, 514, 515

[56] References Cited

UNITED STATES PATENTS

| | | | |
|---|---|---|---|
| 2,150,010 | 3/1939 | Solomon | 280/511 X |
| 2,458,209 | 1/1949 | Sawatzki | 280/511 |
| 2,567,530 | 9/1951 | Schule | 280/511 |
| 3,199,894 | 8/1965 | McClive | 280/483 |
| 3,542,400 | 11/1970 | Mason | 280/492 |
| 3,574,363 | 4/1971 | Stephenson | 287/21 |
| 3,700,263 | 10/1972 | Day | 280/415 A |
| 3,827,724 | 8/1974 | Ackley | 280/511 |

FOREIGN PATENTS OR APPLICATIONS

| | | |
|---|---|---|
| 83,746 | 3/1954 | Norway |
| 230,654 | 3/1925 | United Kingdom |
| 444,106 | 3/1936 | United Kingdom |

Primary Examiner—Philip Goodman
Assistant Examiner—R. Schrecengost
Attorney, Agent, or Firm—Price, Heneveld, Huizenga & Cooper

[57] ABSTRACT

The specification discloses a vehicular trailer hitch apparatus for converting ball-type trailer hitches to receive the hitch ring of a Lunette-eye trailer tongue. A pair of matching half cylinders are fitted around the ball member, rest on the support for the ball member, and form an inner cylinder. An outer cylinder, received on and releasably pinned to the inner cylinder, provides a receiving area for the pivotal mounting of the hitch ring. A contoured shoulder on the inside of the inner cylinder contacts the ball member to prevent removal of the cylinders from the ball member. At least one projection on the outer cylinder prevents removal of the hitch ring therefrom. Alternately, smaller hitch rings may be pivotally received around the inner cylinder with the outer cylinder secured in an inverted arrangement to retain the hitch ring on the inner cylinder.

22 Claims, 9 Drawing Figures

TRAILER HITCH ADAPTER

BACKGROUND OF THE INVENTION

This invention relates to vehicular trailer hitches and, more particularly, to adapter apparatus for converting ball-type trailer hitches to pintle-type trailer hitches.

Trailers for construction equipment and other heavy duty trailers often use Lunette-type or Lunette-eye trailer tongues. A Lunette-type tongue includes a rigid, durable, hitch ring in the shape of a torus which is typically received over an upwardly projecting, hitch post secured to a vehicle. While the Lunette-eye tongue allows a certain amount of vertical pivoting by the trailer, the primary pivotal movement allowed is horizontal. Lunette tongues have been found advantageous especially with construction type equipment because they obviate the need for sockets and other closed hitching structure which is subject to corrosion, dirt collection, and deterioration when exposed to weather and severe operating conditions.

Prior to the present invention, it has been necessary to provide a specially fabricated pin or post for receiving the hitch ring of a Lunette-eye tongue. Since the tractor vehicle normally used to tow such equipment must often be used to pull other type trailers, some of which include socket tongues for use with ball-type trailer hitches, conversion between the post or pin and the ball-type hitch has often been inconvenient and time consuming. In certain situations, the entire trailer hitch had to be changed in order to tow trailers with different type tongues.

Moreover, rather than changing from hitch to hitch, the hitch ring of the Lunette-eye tongue was sometimes merely placed around the ball member of the ball-type hitch. In such case, the downward tongue weight of the trailer was relied upon to retain the hitch ring around the ball member without any positive retaining action. This resulted in dangerous situations in which the trailer could easily break free from the towing vehicle because nothing positively held the hitch ring on the ball member. Further, the fit between a hitch ring and ball member was sloppy often causing damage to the hitch itself.

Another problem encountered even when especially designed posts or pins were secured to a tractor vehicle was the difficulty in accommodating varying sizes of hitch rings of Lunette-eye tongues. If the pin or post was sized to fit the smallest internal diameter hitch ring, a great deal of slop or play was encountered when larger hitch rings were towed with the special hitch. Such slop or play greatly increased the wear factor and shortened the useful life of the hitch apparatus.

Thus, prior to the present invention, there was a significant need for a trailer hitch apparatus which could easily be converted between ball and socket connections for lighter duty trailers and pintle-type hitch ring connections of the type used with Lunette-eye trailer tongues for heavier duty applications. In addition, there was a need for a pintle-type hitch apparatus which could accommodate trailer tongues of varying sizes and yet still be durable, long wearing, and safe for extended periods of time.

SUMMARY OF THE INVENTION

Accordingly, the present invention provides a vehicular trailer hitch apparatus which enables the conversion from a ball-type trailer hitch assembly to a pintle-type trailer hitch assembly. The invention provides a simple, durable, and long wearing assembly which is easily fitted around the ball member of a ball-type trailer hitch to provide an upstanding cylinder or post for receiving the hitch ring of a Lunette-eye trailer tongue such that the tongue, and thus the trailer to which it is attached, may pivot primarily horizontally and somewhat vertically about the upstanding cylinder or post. The conversion apparatus may be used in varying arrangements to accommodate hitch rings of different sizes and yet, in each arrangement, includes apparatus for holding the hitch ring on the cylinder or post while allowing the pivotal movement therearound.

In its broader aspects, the invention is a vehicular trailer hitch apparatus including cylinder means formed in at least two parts for engaging the ball member of a ball-type trailer hitch, which ball member projects outwardly from a support member. The cylinder means include internal shoulder means for engaging a surface of the ball member to prevent removal of the cylinder means from the ball as well as receiving means for receiving the hitch ring of a Lunette-ring trailer tongue therearound. Securing means are provided on the cylinder means for engaging and holding the parts of the cylinder on the ball member as well as retaining means for retaining the hitch ring on the receiving means while allowing pivotal movement about the receiving means.

In the preferred embodiments, the securing means for holding the parts of the cylinder means together around the ball member is a second or outer cylinder which is releasably pinned to the inner cylinder. Projection means such as outwardly extending flanges or an annular flange around the outer cylinder retain the Lunette-eye tongue on the cylinder receiving means.

For larger hitch rings, the hitch ring is received around the exterior of the outer cylinder. For smaller type hitch rings, the hitch ring is received around the exterior of the inner cylinder with the outer cylinder inverted such that one of its end surfaces forms an abutment preventing disassembly of the hitch ring from the apparatus.

In other preferred aspects, a pair of spaced internal shoulder means may be provided on the inner cylinder, each being spaced at a different distance from its respective end of the inner cylinder so that ball members located at different heights above their support members can be accommodated merely by inverting the inner cylinder. The apparatus is also dimensioned to accept different diameter ball members.

These and other objects, advantages, purposes, and features of the invention will become more apparent from a study of the following description taken in conjunction with the drawings.

DESCRIPTION OF THE PREFERRED EMBODIMENTS

Figure 1:
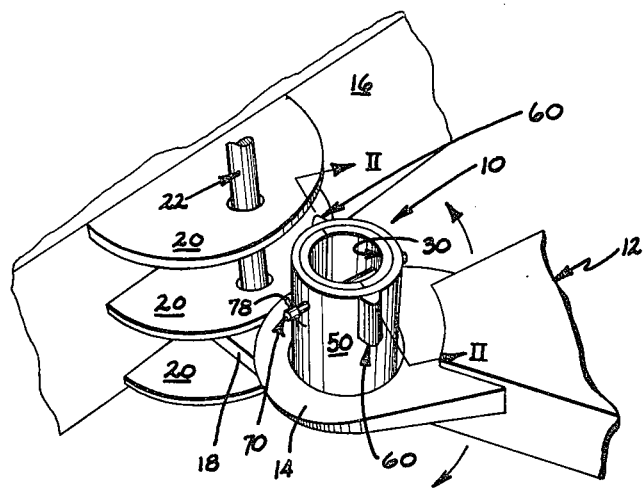
FIG. 1 is a fragmentary, perspective view of the trailer hitch apparatus of the present invention assembled on a typical ball-type trailer hitch and receiving the hitch ring of a Lunette-type trailer tongue therearound.

Referring now to the drawings in greater detail, FIG. 1 illustrates the preferred form 10 of the present apparatus for converting a ball-type trailer hitch to a pintle-type hitch for receiving the hitch ring 14 of a Lunette-type trailer hitch tongue 12 therearound. Typically, as is best seen in FIGS. 1, 2, 6, and 7, a ball-type trailer hitch assembly is included on the rear of a tractor vehicle having a rear frame member or bumper 16 and a cantilevered support member 18 extending rearwardly therefrom. In the embodiment shown in the present figures, the support member or plate 18 is removably secured to between a pair of support flanges 20 which are welded or otherwise secured to extend rearwardly and outwardly from the frame member 16. A removable pin 22 is inserted through aligned apertures in the plate members 20 to secure plate 18 in place. Upon vertical removal of the pin 22, plate 18 can be removed and/or replaced with a different type of trailer hitch apparatus. The generally spherical ball member 24, having a downwardly extending, threaded stem 26, extends upwardly and outwardly from the top surface of support member or plate 18 and is secured thereon by a nut 28 engaging stem 26 and the bottom surface of the support. The present invention may also be used with more conventional ball-hitch supports than that shown in FIGS. 1, 6, and 7 such as one welded or otherwise permanently secured to a vehicle. With the present conversion apparatus 10, removal and/or replacement of the ball-type trailer hitch to accommodate Lunette-eye trailer tongues is unnecessary.

Generally, the present conversion apparatus includes an inner cylinder 30, typically formed in at least two parts and an outer cylinder 50 or 80 fitted over the inner cylinder. An internal shoulder 34, 36 retains the cylinders on the ball member and at least one projection 60 retains the hitch ring 14 about the cylinders. A securing pin 70 holds the cylinders together.

Figure 2:
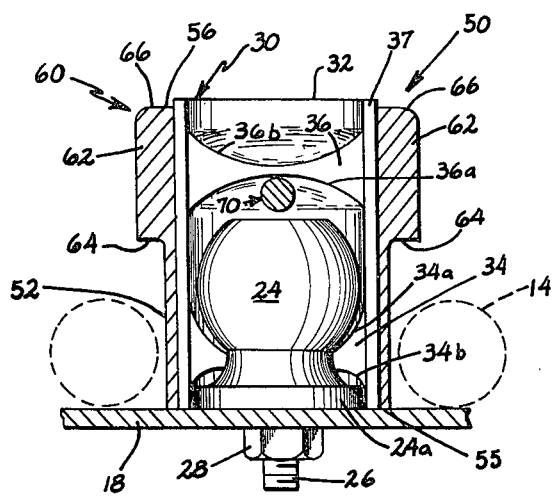
FIG. 2 is a fragmentary, sectional view of the hitch apparatus assembled on a ball member of a ball-type trailer hitch and retaining the hitch ring of a Lunette-type trailer tongue taken along plane II—II of FIG. 1.
Figure 4:
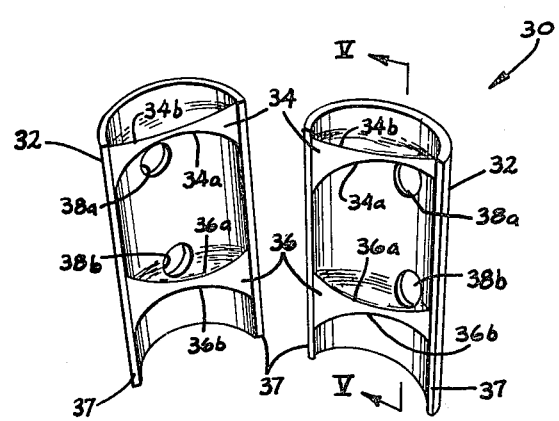
FIG. 4 is a perspective view of the matching half cylinder portions which are fitted together around the ball member to form the inner cylinder of the present apparatus.

As is best seen in FIGS. 2–6, the inner cylinder 30 is preferably formed from two identical cylinder halves 32, each half including a pair of contoured inner shoulder portions 34, 36. The internal surfaces of shoulders 34, 36, which face one another, are preferaby contoured to match the shape of the hemispherical under surface of the spherical ball member 24 around which they will be positioned when the conversion apparatus is inserted on a ball-type trailer hitch. These facing surfaces 34a and 36a (FIG. 4) may be cast or molded if the cylinder halves 32 are cast or molded, or in the alternative, may be machined or otherwise formed if the inner shoulder is welded inside the cylinder half. The opposite shoulder surfaces 34b, 36b which face the outermost ends of the cylinder halves 32, are also contoured and curved to merge with the inner cylinder surface for strength of the internal shoulders and to provide room for the base 24a of the ball member 24 (FIG. 2). Each cylinder half also includes circular apertures 38a and 38b which extend completely through the cylinders and through contoured surfaces 34a, 36a, respectively. Apertures 38a, 38b receive the securing pin 70 when the apparatus is assembled.

Figure 3:
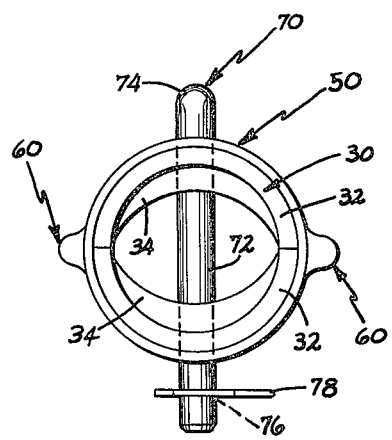
FIG. 3 is a plan view of the hitch apparatus shown in FIGS. 1 and 2.
Figure 9:
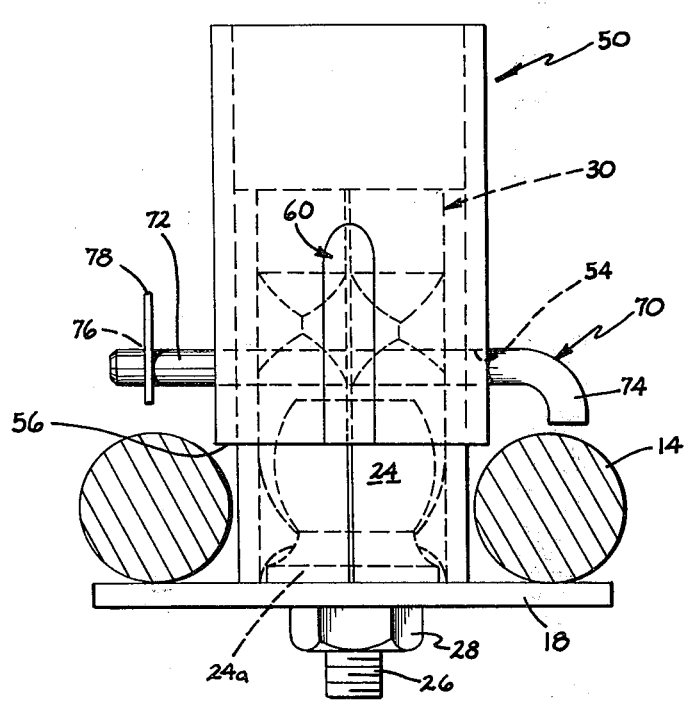
FIG. 9 is a side elevation of the present invention illustrating the reception of a smaller diameter hitch ring from a Lunette-type tongue about the inner cylinder with the outer cylinder pinned inverted.

As is best seen in FIGS. 1, 3, and 9, cylinder halves 32 are designed to have their vertical side edges abut and touch one another such that together the cylinder portions form an inner cylinder which encloses and surrounds the ball member 24. At least one of the internal shoulders 34, 36 is located adjacent to and/or in engagement with the underhemispherical surface of ball member 24. The internal shoulders 34, 36 taper to the vertical side edges 37 of the cylinder halves 32 such that the shoulder extends around the inner circumference of the cylinder but forms a generally elliptical opening through which the base of the ball member 24 passes when the halves are fitted together around the ball member (FIG. 3). Preferably, cylinder halves 32 form a right circular cylinder having an inside diameter slightly greater than the largest diameter of a ball member with which the apparatus will be used. The apparatus can, therefore, also be used with ball members having diameters less than that largest diameter. The outside diameter of the right circular cylinder is generally smooth so that the outer cylinder 50 can be telescoped thereover (FIG. 7) or a small diameter hitch ring from a Lunette-eye trailer tongue may be received therearound (FIG. 9).

Figure 5:
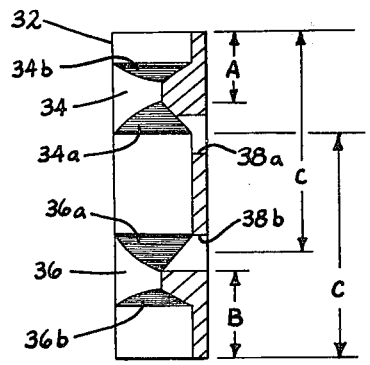
FIG. 5 is a sectional side elevation of one of the inner half cylinder portions taken along plane V—V of FIG. 4.

The internal shoulders 34, 36 are spaced at different distances from the respective ends of the cylinder halves 32. By merely inverting halves 32 upon assembly, ball members located at different distances above their support plates 18 can be accommodated. As shown in FIG. 5, internal shoulder 34 is spaced a distance A from its respective end of cylinder half 32 while shoulder 36 is spaced inwardly from its end a distance B greater than distance A. However, securing apertures 38a, 38b are each preferably spaced the same distance C from their opposing cylinder half ends (FIG. 5).

Referring now to FIGS. 1–3 and 7, one embodiment of the outer cylinder 50 is preferably formed in one piece in the shape of a right, circular cylinder. Cylinder 50 has an inside diameter slightly larger than the outside diameter of right circular inner cylinder 30 such that the same can be easily telescoped over the inner cylinder. Enough clearance space is provided so that an easy fit will be provided even if severe operating conditions such as snow, dirt, ice, or the like are encountered during use. The exterior diameter of the outer cylinder 50 is dimensioned to be slightly less than the inside diameter of the largest hitch ring 14 of a Lunette-eye trailer tongue 12 which will be used with the apparatus. Obviously, the entire apparatus 10 may be dimensioned as desired to fit any size ball member and Lunette-eye trailer tongue 12, although it is desirable to size the preferred form of the apparatus to fit as many trailer hitches as is possible without excessive play or clearance being included.

Elongated ear flanges 62, providing the projections 60 referred to above, are welded or otherwise secured to the exterior surface of the cylinder 50 adjacent one end thereof and parallel to the axis of the cylinder at diametrically opposed positions. A pair of aligned, securing pin-receiving apertures 54 are provided adjacent cylinder end 56 but spaced circumferentially from ear flanges 62. The bottom end surfaces 64 of ear flanges 62 provide abutment surfaces having a dimension greater than the internal diameter of the Lunette-type hitch ring 14. Ear flanges 62 thus extend out and over the hitch ring to retain the same around the cylinders should the hitch ring move vertically thereon. Since projections or ear flanges 62 are located at one end of the cylinder, the opposite end of the cylinder provides a right, cylindrical receiving surface area 52 spaced intermediate support 18 and the projections 62. Area 52 receives hitch ring 14 and allows it to pivot therearound.

As will be understood from FIGS. 1–3, 7, and 9, outer cylinder 50, when telescoped over inner cylinder 30 retains and holds the two portions 32 of the inner cylinder together. In order to retain outer cylinder 50 around inner cylinder 30, a securing pin 70 is inserted through aligned apertures 54 in the outer cylinder and aligned apertures 38a or 38b in the inner cylinder. Pin 70 includes a shaft 72, an offset or head portion 74, and an aperture 76 receiving a removable, spring biased cotter key or cotter pin 78. Head 74 and cotter key 78 both hold cylinder portions 32 together and prevent removal of shaft 72 except when cotter key 78 is removed. If the outer cylinder receives the hitch ring 14 as shown in FIGS. 1 and 2, cylinder 50 is positioned with ear flanges 62 spaced outwardly of ring 14. Apertures 54 are spaced above ball 24 and in alignment with one of the sets of apertures 38a or 38b. If inner cylinder 30 receives a smaller hitch ring 14 as shown in FIG. 9, outer cylinder 50 is inverted so that the end surface 56, adjacent which ear flanges 62 are secured, provides an abutment surface along with ends 66 of ear flanges 62 to prevent disassembly of the hitch ring from the cylinders. In either case, shaft 72 of pin 70 passes immediately above the surface of ball 24 which is farthest from support 18 (FIGS. 2 and 9).

Figure 8:
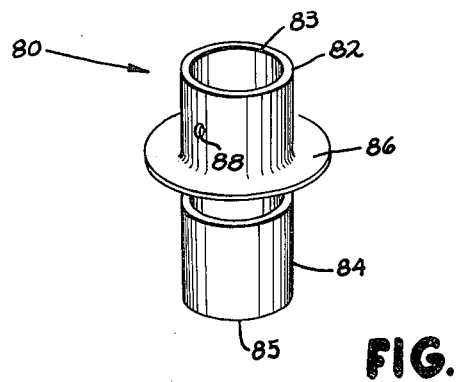
FIG. 8 is a perspective view of an alternative embodiment of the outer cylinder.

Alternately, a second form 80 of the outer cylinder may be used as is shown in FIG. 8. Outer cylinder 80 includes a pair of axially aligned cylinder portions 82, 84 of equal length each of which have identical inner and outer diameter dimensions. The length of each portion 82, 84 is approximately one-half the entire length of outer cylinder 50 such that when axially aligned, cylinder portions 82, 84 are generally coextensive with inner cylinder 30 just as is outer cylinder 50. Cylinder portion 82 also includes a radially outwardly extending, annular ring 86 welded or otherwise secured to one end thereof. Ring 86 corresponds to projections 62 and holds the hitch ring 14 on the cylinders when it is received about the outer circumference of the lower cylinder portion 84. Cylinder portion 82 also includes a pair of aligned circular apertures 88, located closer to end 83 than end 85 when the cylinder portions are aligned, which receive securing pin 70 in a manner similar to apertures 54 in outer cylinder 50. Embodiment 80 of the outer cylinder is especially useful for conversion of ball-type hitches when a close overhang of rear portions of the tractor vehicle over the top of the ball 24 would otherwise prevent the telescoping assembly of a longer cylinder, such as cylinder 50 over the top of inner cylinder 30. In such case, the two half length cylinder portions 82, 84 can be individually telescoped one after the other over the inner cylinder.

Figure 6:
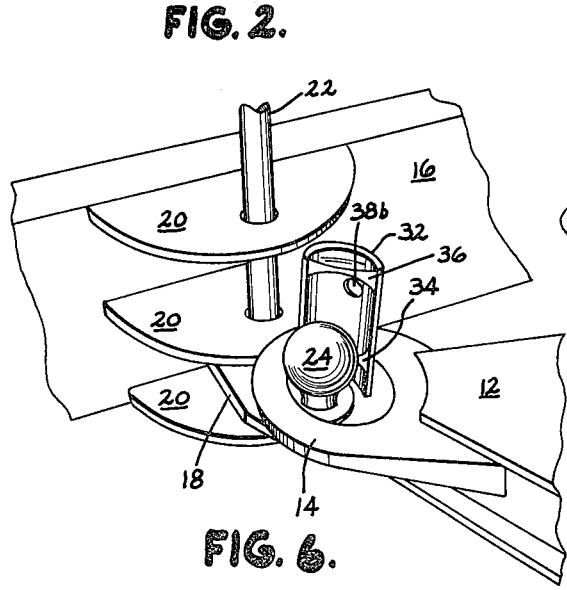
FIG. 6 is a fragmentary, perspective view of one of the inner half cylinder portions positioned about the ball member of a ball-type trailer hitch with the hitch ring of the Lunette-type tongue positioned therearound.

For assembly and operation of the conversion apparatus, the hitch ring 14 of lunette-eye trailer tongue 12 is placed over ball member 24 and pulled off center such that one side of the ring contacts a surface of ball member 24 (FIG. 6). One of the half cylinders 32 is then inserted endwise in the opening between the non-contacting side of the ring and ball member 24 after first determining the height of ball 24 above support member 18. Depending on the ball height, the properly spaced inner shoulder 34 or 36 is positioned below the underhemisphere of ball member 24. Thereafter, hitch ring 14 is slid against the inserted half cylinder 32, trapping it against the ball member and providing room on the opposite side of the ball for insertion of the remaining half cylinder 32. The remaining half cylinder 32 is inserted with internal shoulder 34 or 36 positioned similarly to that in the first positioned half cylinder.

Figure 7:
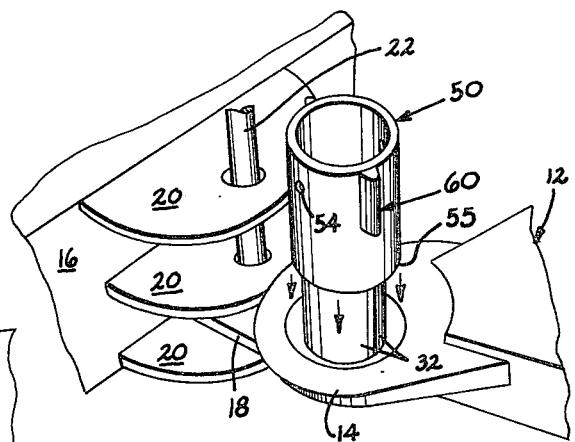
FIG. 7 is a fragmentary, perspective view of the telescoping assembly of the outer cylinder around the matching inner half cylinder portions of the inner cylinder.

When hitch ring 14, which is now surrounding the two abutting, cylinder halves 32, is of a large diameter, outer cylinder 50 or cylinder portions 82, 84 of outer cylinder 80 are telescoped over the top edge of inner cylinder 30 as shown in FIG. 7. In this case, end edge 55 of outer cylinder 50 or end edge 85 of cylinder 80 will be first inserted over the top of inner cylinder 30 and slid downwardly until it rests on support 18 as is shown in FIG. 2. Hitch ring 14 will thereby be trapped between end surfaces 64 of ear flanges 62 or annular ring 86 and support 18 while pivotal movement thereof is allowed around the receiving area of the outer cylinder. Thereafter, removable securing pin 70 is inserted through the aligned apertures 54 or 88 and 38a or 38b to secure the outer cylinder 50 or 80 around inner cylinder 30 thereby retaining the cylinder halves 32 together. When so retained, the internal shoulders 34 or 36 prevent outward movement of the combined cylinders away from support 18 retaining the entire apparatus in its operable position.

If the hitch ring 14 is of a diameter smaller than the inside diameter of outer cylinder 50 or 80, outer cylinder 50 or cylinder portion 82 is inverted with end surface 56 or 83 being telescoped first over the upper end of inner cylinder 30. Securing pin 70 is inserted through the aligned apertures in the inner and outer cylinders as shown in FIG. 9 such that cylinder end surface 56 and surfaces 66 of ear flanges 62 or end surface 83 of cylinder portion 82 provide the abutment surfaces retaining hitch ring 14 around inner cylinder 30.

Accordingly, the apparatus provides a simple, durable assembly for converting a ball-type trailer hitch to accommodate hitch rings of Lunette-eye trailer tongues of varying sizes merely by inverting the outer cylinder. Further, ball members of varying heights above their support members or of different diameters can be easily accommodated merely by inverting the inner cylinder during assembly.

While several forms of the invention have been shown and described, other forms will now be apparent to those skilled in the art. Therefore, it will be understood that the embodiments shown in the drawings and described above are merely for illustrative purposes and are not intended to limit the scope of the invention which is defined by the claims which follow.

The embodiments of the invention in which an exclusive property or privilege is claimed are defined as follows:

1. Vehicular trailer hitch apparatus comprising cylinder means formed in at least two parts for engaging the ball member of a ball-type trailer hitch of the type having a support member from which the ball member projects outwardly, said cylinder means including internal shoulder means for engaging a surface of the ball member to prevent removal of said cylinder means from the ball member, and receiving means for receiving a hitch ring of a Lunette-eye trailer tongue therearound; securing means engaging and holding said parts of said cylinder means on the ball member; and retaining means for retaining the hitch ring on said receiving means while allowing pivotal movement about said receiving means.

2. The hitch of claim 1 wherein said cylinder means is adapted to rest on the ball member support member and extend outwardly from the support member to a position at least flush with the surfaces of the ball member farthest from the support member.

3. The hitch of claim 1 wherein said securing means include outer cylinder means received around said first-mentioned. inner cylinder means and second retaining means for retaining said outer cylinder around said inner cylinder means.

4. The hitch of claim 3 wherein said outer cylinder means include one end adapted to rest on a support member for a ball member of a ball-type trailer hitch and a second end opposite said one end; said retaining means being positioned on said outer cylinder means closer to said second end than said receiving means.

5. The hitch of claim 4 wherein said inner cylinder means includes a pair of matching, half cylinders each including a portion of said internal shoulder means, said internal shoulder means having a surface contoured to the shape of a ball member of a ball-type trailer hitch and adapted to engage surface portions of the lower or under hemisphere of the ball member.

6. The hitch of claim 5 wherein said inner cylinder means includes two ends and an internal shoulder extending around the inner circumference adjacent each end thereof, each shoulder having a surface contoured to the shape of a ball member of a ball-type trailer hitch, each shoulder being spaced from its respective end of said inner cylinder means a different distance whereby said pair of inner half cylinders can be inverted to accommodate ball members supported at different distances from their support members.

7. The hitch of claim 6 wherein said outer cylinder means is an outer cylinder having an inside diameter slightly larger than said inner cylinder means and is telescoped thereover, said outer cylinder including an annular, right cylindrical exterior surface thereon for receiving the hitch ring therearound when said outer cylinder is telescoped over said inner cylinder means; said retaining means including at least one projection extending outwardly of said outer cylinder exterior surface; said second retaining means includng a pin inserted through aligned apertures in said pair of inner half cylinders and said outer cylinder generally transverse to the axes of said cylinders, said pin including an offset portion on one end and releasable securing means on the other end for preventing removal of said pin from said cylinders except when desired.

8. The hitch of claim 3 wherein said outer cylinder means covers the exterior of said inner cylinder means and includes second receiving means for receiving therearound and engaging the hitch ring of a Lunette-type trailer tongue when said outer cylinder means is received around said inner cylinder means.

9. The hitch of claim 8 wherein said second retaining means is an annular ring secured generally transverse to the axis of said outer cylinder means about the exterior of said outer cylinder means.

10. The hitch of claim 8 wherein said second retaining means include a pair of projections extending beyond and secured to the exterior surface of said outer cylinder means on opposite sides thereof.

11. The hitch of claim 8 wherein said inner and outer cylinder means include inner and outer right circular cylinders telescopically fitted one within the other.

12. The hitch of claim 1 wherein said cylinder means includes two ends and an internal shoulder extending around the inner circumference adjacent each end thereof, each shoulder having a surface contoured to the shape of a ball member of a ball-type trailer hitch, each shoulder being spaced from its respective end of said cylinder means a different distance whereby said cylinder means can be inverted to accommodate ball members supported at different distances from their support members.

13. The hitch of claim 12 wherein said securing means includes a pin passed through said two parts of said cylinder means and means on either end of said pin for holding said cylinder parts together and for preventing removal of said pin therefrom, said means on at least one end of said pin being releasable for removal of said pin when desired.

14. Vehicular trailer hitch apparatus for converting ball-type hitches to pintle-type hitches comprising inner cylinder means for engaging the ball member of a ball-type trailer hitch of the type having a support member from which the ball member extends outwardly, said cylinder means being formed in at least two parts for positioning around the ball member and including internal shoulder means for engaging an under surface of the ball member to prevent removal of said inner cylinder means from the ball member; outer cylinder means received around said inner cylinder means for retaining said parts of said inner cylinder means together about the ball member; at least one of said inner and outer cylinder means including receiving means for receiving the hitch ring of a Lunette-eye trailer tongue therearound; said outer cylinder means including engagement means for engaging the hitch ring when received around said outer cylinder means to prevent removal of said hitch ring from said receiving means; and securing means for retaining said outer cylinder means around said inner cylinder means whereby said hitch ring may freely pivot about said outer cylinder means while retained thereon by said engagement means.

15. The hitch of claim 14 wherein said inner and outer cylinder means are generally coextensive; said receiving means including an annular, right cylindrical exterior surface area on said outer cylinder means; said engagement means including an abutment surface on the exterior of said outer cylinder, said abutment surface overlying and abutting the hitch ring when received on said receiving means to prevent removal of the hitch ring.

16. The hitch of claim 15 wherein said abutment surface is included on a projection extending outwardly of the exterior surface of said outer cylinder means.

17. The hitch of claim 15 wherein said inner cylinder means includes a pair of matching cylinder portions each including a portion of said internal shoulder means, said portions adapted to fit together and encompass the ball member and having a right, circular cylindrical exterior surface when fitted together; said cylinder portions each including one end adapted to rest on the support member for a ball member and extend beyond the surface of the ball member farthest from the support member.

18. The hitch of claim 17 wherein said outer cylinder means is a right, circular cylinder having an inside diameter slightly larger than said exterior surface of said matching inner cylinder portions.

19. The hitch of claim 17 wherein said securing means includes a pin passed through aligned apertures in said outer cylinder and matching inner cylinder portions and means on either end of said pin for holding said cylinder parts together and for preventing removal of said pin therefrom, said means on at least one end of said pin being releasable for removal of said pin when desired.

20. The hitch of claim 15 wherein said inner cylinder means includes two ends and an internal shoulder extending around the inner circumference of said inner cylinder means adjacent each end thereof, each shoulder having a surface contoured to the shape of a ball member of a ball-type trailer hitch, each shoulder being spaced from its respective end of said inner cylinder means a different distance whereby said inner cylinder means can be inverted to accommodate ball members supported at different distances from their support members.

21. The hitch of claim 14 in combination with a ball-type vehicular trailer hitch, said ball-type hitch including means for securing it to a vehicle, a support member, and a generally spherical ball member extending outwardly from said support member; said inner cylinder means resting on said support member and extending therearound and outwardly beyond the surface of said ball member which is farthest from said support member.

22. Vehicular trailer hitch apparatus comprising a ball-type vehicular trailer hitch having means for securing said hitch to a vehicle, a support member, and a generally spherical ball member extending outwardly from said support member; and conversion apparatus for converting said ball-type hitch to a pintle-type hitch including cylinder means formed in at least two parts for engaging said ball member, said cylinder means including internal shoulder means for engaging a surface of said ball member to prevent removal of said cylinder means from said ball member, and receiving means for receiving a hitch ring of a Lunette-eye trailer tongue therearound; securing means engaging and holding said parts of said cylinder means on said ball member; and retaining means for retaining the hitch ring on said receiving means while allowing pivotal movement of the hitch ring about said receiving means.

* * * * *

UNITED STATES PATENT AND TRADEMARK OFFICE
CERTIFICATE OF CORRECTION

PATENT NO. : 4,004,822
DATED : January 25, 1977
INVENTOR(S) : Harold E. Fisk

It is certified that error appears in the above-identified patent and that said Letters Patent are hereby corrected as shown below:

```
Column 1, line 10;
     "Lunette-type" should be --Lunette-eye--;
Column 2, line 22;
     "Lunette-ring" should be --Lunette-eye--;
Column 3, line 67;
     "preferaby" should be --preferably--;
Column 6, line 9;
     "lunette-eye" should be --Lunette-eye--;
Column 7, line 64;
     "includng" should be --including--;
Column 8, line 7;
     "type" should be --eye--;
Column 8, line 31;
     "includes" should be --include--.
```

Signed and Sealed this

Seventeenth Day of May 1977

[SEAL]

Attest:

RUTH C. MASON
*Attesting Officer*

C. MARSHALL DANN
*Commissioner of Patents and Trademarks*